United States Patent [19]

Bauhof

[11] Patent Number: 5,184,870
[45] Date of Patent: Feb. 9, 1993

[54] RAISABLE-SLIDING ROOF OF SHALLOW CONSTRUCTION FOR MOTOR VEHICLES

[75] Inventor: Karl Bauhof, Weinsberg, Fed. Rep. of Germany

[73] Assignee: Karosseriewerke Weinsberg GmbH, Fed. Rep. of Germany

[21] Appl. No.: 879,814

[22] Filed: May 7, 1992

Related U.S. Application Data

[63] Continuation of Ser. No. 746,792, Aug. 12, 1991, abandoned, which is a continuation of Ser. No. 622,333, Nov. 27, 1990, abandoned, which is a continuation of Ser. No. 326,092, Mar. 21, 1989, abandoned.

[30] Foreign Application Priority Data

Mar. 21, 1988 [DE] Fed. Rep. of Germany ....... 3809458

[51] Int. Cl.$^5$ .............................................. B60J 7/057
[52] U.S. Cl. ..................................... 296/223; 296/216; 296/221; 74/89.2
[58] Field of Search ............... 296/216, 223, 221, 222; 74/89.2

[56] References Cited

U.S. PATENT DOCUMENTS

| | | | |
|---|---|---|---|
| 4,159,144 | 6/1979 | Ehlen et al. | 296/216 |
| 4,298,226 | 11/1981 | Mizuma | 296/220 |
| 4,624,501 | 11/1986 | Niwa et al. | 296/222 |
| 4,671,564 | 6/1987 | Sumida et al. | 296/223 X |
| 4,741,572 | 5/1988 | Bauhof | 296/223 X |

FOREIGN PATENT DOCUMENTS 3739504 6/1989 Fed. Rep. of Germany.

Primary Examiner—Dennis H. Redder
Attorney, Agent, or Firm—Harness, Dickey & Pierce

[57] ABSTRACT

A sliding-raisable roof of shallow construction of motor vehicles. The roof is rigid and is supported by a sliding roof case which is displaceable between at least two positions, one raised and one lowered normal position. Sliding blocks slidably disposed in guide rails form a displacement apparatus, one such apparatus being arranged on each side of the roof case. The roof top can be raised at its rear end into an exposed ventilating position by means of an exposure mechanism supported against rear sliding blocks. Two compression-resistant threaded cables and a single drive motor are used to drive the roof top and displace the sliding roof case. Each of the two threaded cables coact on one end with the displacement apparatus of the sliding roof case and on the other end with the roof top or its exposure mechanism. Free travel of one or the other end of the threaded cables is provided for alternatively driving the displacement apparatus of the sliding roof case and the exposure mechanism of the roof top.

8 Claims, 6 Drawing Sheets

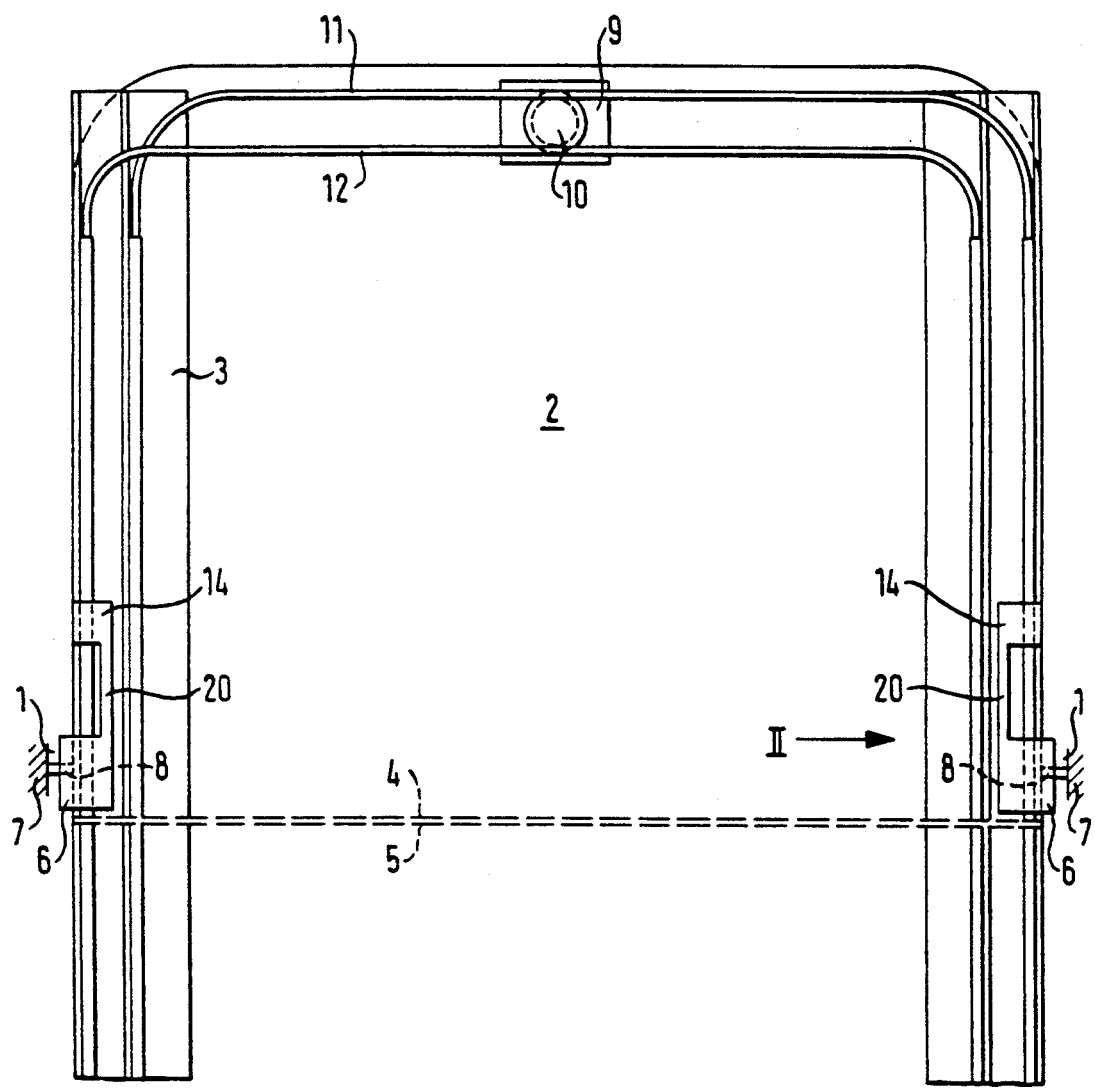

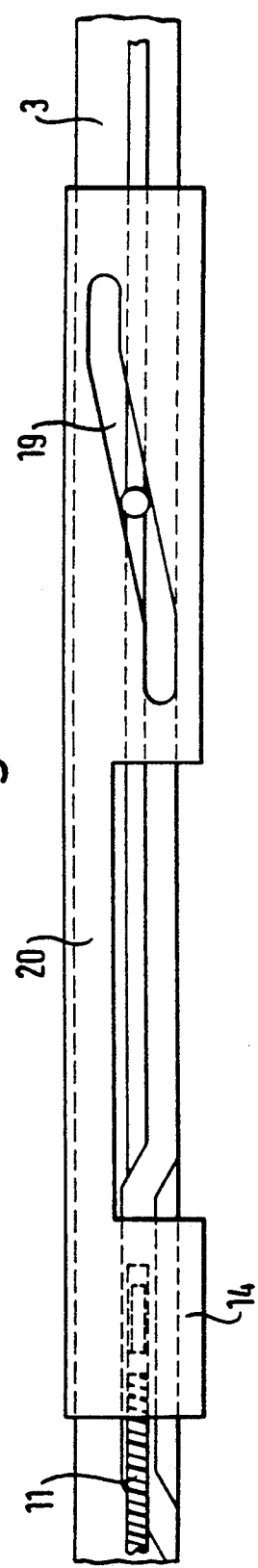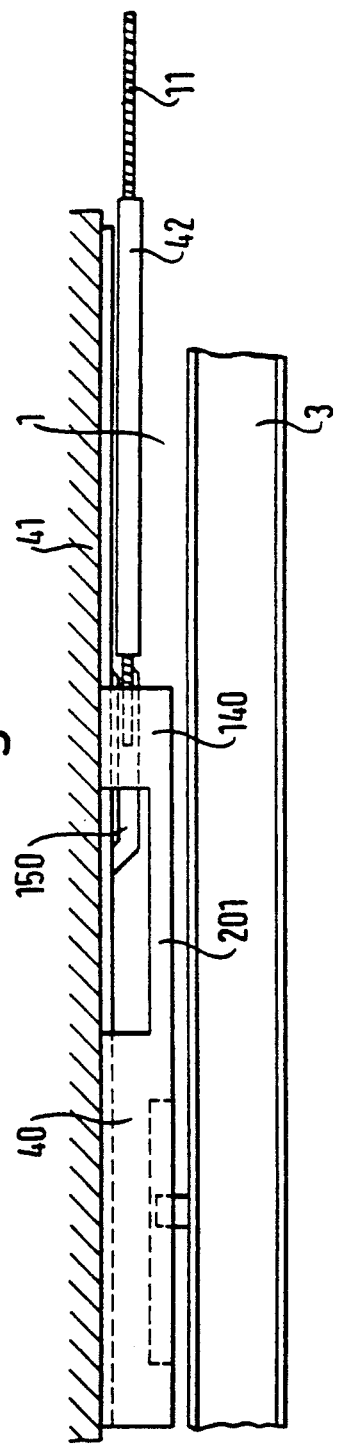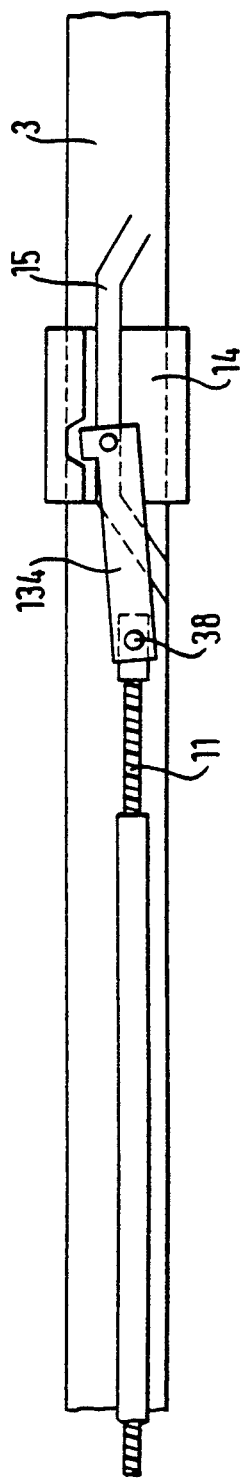

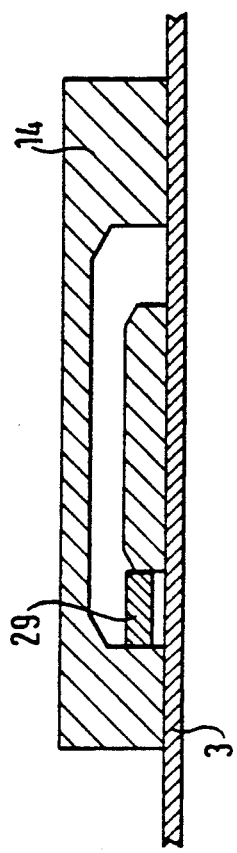
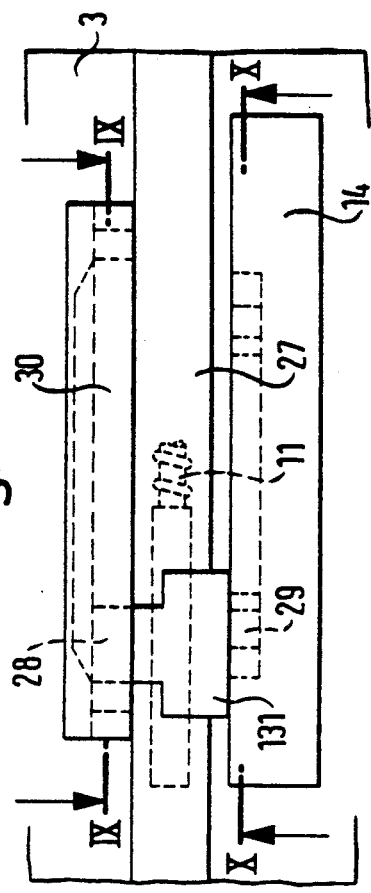
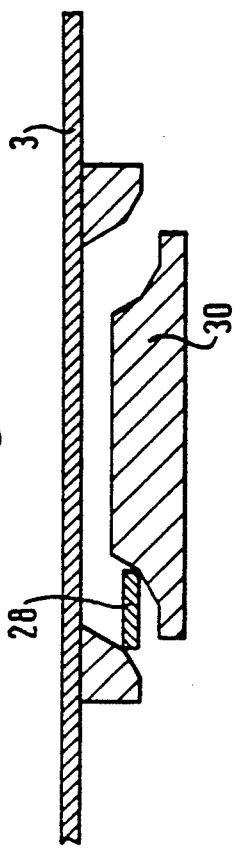
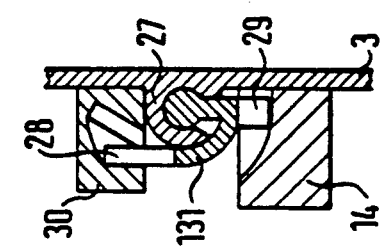

RAISABLE-SLIDING ROOF OF SHALLOW CONSTRUCTION FOR MOTOR VEHICLES

This is a continuation of U.S. patent application Ser. No. 746,792, filed Aug. 12, 1991, now abandoned, which is a continuation of Ser. No. 622,333 filed Nov. 27, 1990, now abandoned, which is a continuation of Ser. No. 326,092, filed Mar. 21, 1989, now abandoned.

BACKGROUND OF THE INVENTION

The present invention is directed to a raisable-sliding roof of shallow construction for motor vehicles having a rigid rooftop supported by a sliding roof case. The roof is displaceable between at least two positions, one raised position and one lowered normal position, by means of a plurality of attached sliding blocks which are slidably disposed in guide rails arranged on both sides of the sliding roof case. The roof top is liftable at its rear end into an exposed ventilating position by means of an exposing mechanism supported against rear sliding blocks. Motor driven threaded cables are used in the displacement of the sliding roof case and to drive the exposable roof top.

It is known to provide raisable-sliding roofs of shallow construction having a sliding roof case subdivided transversely to the driving direction wherein both parts are interconnected and are conveyed into a raised position prior to the lifting of the roof top into an exposed ventilating position, thereby creating a buckling movement of the case. This is to achieve as great an exposure height of the roof top as possible with the smallest possible space requirement of the exposure mechanism, while attempting to reduce the required installation height for the raisable-sliding roof.

Since herein a displacement of the sliding roof case can only occur if the roof top is in its closed position, it has up to now been accomplished with separate motor drives for the sliding roof case actuation and for the roof top actuation. Such a twin arrangement of motorized drives is however very expensive and, in addition, undesirably increases the overall weight of the vehicle. Additionally, because of the absolutely necessary separation of the drive or displacement movements of the sliding roof case and roof top, complicated electronic controls must also be provided for the two motor drives, in order to eliminate any movement overlaps or positional overlaps between the roof top and the sliding roof case.

SUMMARY OF THE INVENTION

Accordingly, it is an object of the present invention to provide a raisable-sliding roof of shallow construction of the previously mentioned type which, while assuring the simplest possible construction, the lowest possible fabrication cost and simple installation, permits the roof top drive and the displacement of the sliding roof case to be accomplished by means of a single drive motor.

Pursuant to this object, and others which will become apparent hereafter, one aspect of the present invention resides in a raisable-sliding roof having two compression-resistant threaded cables in connection with one single drive motor. The cables are used to drive the roof top and to displace the sliding roof case. Each of the two threaded cables coacts on a first end with the displacement apparatus of the sliding roof case and on a second end with the roof top or its exposure mechanism. Free travel of the first or second ends of the threaded cables is provided for the alternate drive of the displacement apparatus of the sliding roof case and of the displacement apparatus of the roof top.

The special advantage of a raisable-sliding roof of shallow construction in accordance with the present invention is that all the required displacement motions of the raisable-sliding roof can be performed by a single drive motor with the rotary direction of the motor remaining the same. An additional advantage is that only two threaded cables are required for transmitting the driving force of the actuating motor. These cables can be preassembled without any difficulty and especially without increasing the fabrication and installation expenses for the sliding-raisable roof of shallow construction.

In a first embodiment straight tongue or lock-shaped follower or entrainment means are provided. This, however, may occasionally be problematic if the threaded cable has to be redirected around a tight corner.

In another embodiment, the entrainment means are pivotable around a horizontal axis oriented in a longitudinal guide rail and arranged opposite each other in parallel vertical planes. A control lug and an entrainment lug cooperate with a cam-shaped control apparatus arranged fixedly at the guide rail. The entrainment lug cooperates with a sliding block guided in the guide rail and is connected by a bridge member with the cam guide or lug of the case displacement apparatus. This assures a permanent problem-free operation of the sliding raisable roof even when the threaded cables have to be conducted around tight corners.

In a further embodiment, the entrainment means comprises one control lug and one entrainment lug in V-shaped arrangement next to each other and pivotable around a horizontal axis oriented in a guide rail longitudinal direction. The entrainment means is supported to hang in the guide rails and the threaded cables cooperate by their control lug with a cam-shaped control apparatus arranged at an extension of the guide rail base. This extension protrudes beyond the outer guide rail side wall. The cables also cooperate with their entrainment lug and a sliding block displaceably guided at the guide rail wall and connected by a bridge member with the one part of the displacement apparatus of the sliding roof case. This embodiment provides a particularly space-saving design of a sliding-raisable roof of shallow construction which is substantially devoid of problems when the threaded cables have to be conducted around tight corners.

In still another embodiment, the sliding roof case has a displacement arrangement formed by an eccentric disk rotatably supported at one of the arrangement parts, roof frame or guide rail and a lug arrangement at the other of the arrangement parts so as to be displaceable by means of a sliding block.

In yet another embodiment, the displacement apparatus of the sliding roof case consists of a spindle drive supported so as to be secured against rotation at one of the arrangement parts, roof, frame or guide rail or case and the entrainment means are designed as a toothed rack which coacts with the spindle or the spindle nut of the spindle drive.

The invention is described with particularity in the following description of preferred embodiments taken together with the drawing.

BRIEF DESCRIPTION OF THE DRAWING

FIG. 1 is a diagrammatic plan view of a sliding roof case of a sliding-raisable roof of shallow construction pursuant to the present invention;

FIG. 2 is a cutout of a side view in the direction of the arrow II in FIG. 1 at a magnified scale;

FIG. 7 is a sectional illustration through the control device in a second embodiment;

FIG. 8 is a sectional illustration of the control device in FIG. 7 in a horizontal plane;

FIG. 9 is a section through FIG. 8 along the line IX—IX;

FIG. 10 is a section through FIG. 8 along the line X—X;

FIG. 11 is a sectional illustration corresponding to FIG. 7, however with the follower or entrainment device pivoted into an actuating or effective position;

FIG. 13 is a diagrammatic side view of an entrainment or follower device pivotable transversely to the guide rail axis; and FIG. 14 is a diagrammatic plan view upon a displacement device with a portion of the displacement device of the sliding roof case arranged at the roof frame of the vehicle body.

DETAILED DESCRIPTION OF THE PREFERRED EMBODIMENTS

Figure 3:
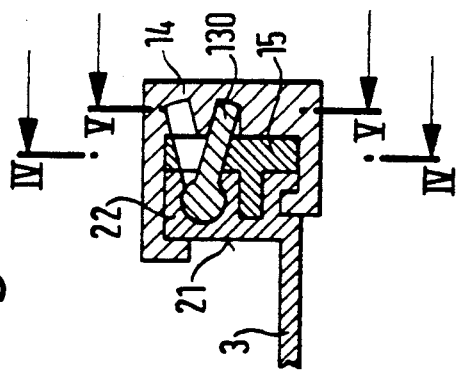
FIG. 3 is an illustration in section through the control apparatus of a first embodiment for the follower or entrainment device assigned to the displacement apparatus of the sliding roof case.

Referring now to the drawings, a sliding roof top is supported so as to be longitudinally displaceable by means of a plurality of sliding blocks. The sliding blocks are disposed in guide rails 3 which are arranged in a sliding roof case 2 disposed beneath a roof cutout 1. The roof top is supported at its rear end by means of an exposing mechanism upon the rear sliding blocks, so that it can be lifted up at its rear end into an exposed ventilation position, this in a known manner.

The sliding roof case 2 is subdivided into two portions 4 and 5, connected with each other so as to be pivotable around an axis directed transversely to the driving direction so that the sliding roof case 2 can be displaced between a lowered normal position and a raised position corresponding to the exposed ventilating position of the roof top.

In a first embodiment, a connecting link or slide 6 is longitudinally guided at guide rails 3 which may be integrally formed with the sliding roof case 2 or solidly connected therewith. The slide 6 coacts with a lug 8 which is rigidly placed on the roof frame 7 so that the sliding roof case 2 can be displaced back and forth between its two possible positions as a function of the displacement of the connecting link or slide 6. A single drive motor 9 both drives the roof top and provides displacement motion of the sliding roof case 2. This drive motor 9 is in driving connection though a pinion 10 with two compression-resistant threaded cables 11 and 12 in a manner known to those skilled in the art.

Cables 11 and 12 are connected respectively at one end in a known manner with the exposure mechanism or the rear sliding block of the sliding roof top making allowance for a free travel corresponding to the displacement height of the sliding roof case. The threaded cables 11 and 12 are each provided with entrainment means 13 at their other end, by which they coact with the adjustment mechanism of the sliding roof case 2 in accordance with a displacement path provided for the entrainment means.

A control apparatus 15 is provided for controlling the engagement of the entrainment means 13 with a sliding block 14 coupled with the respective connecting link 6 of the displacement mechanism of the sliding roof case 2. This control arrangement 15 comprises essentially a rising incline 16, a control groove 17 and a descending incline 18, and is arranged fixedly at the guide rails 3. In control mechanism 15, the control groove 17 has an overall length corresponding to the length of a slotted guide 19 in the connecting link or slide 6. The sliding block 14 is connected with the connecting link 6 of the sliding roof case 2 by means of a bridge member 20. The length of the bridge member 20 corresponds to the adjustment travel of the exposure mechanism of the roof top in such a way that a displacement of the sliding roof case is only possible when the sliding roof top has been lowered to its closed position.

In the embodiment depicted in FIGS. 3 to 6, the threaded cable 11, 12 is received and guided in a tube-shaped guide 22 designed to form one piece with the outer side wall 21 of the guide rail 3. In addition, the tube-shaped guide 22 comprises a widening across the length of the control mechanism 15 which permits the entrainment means 130, designed as a straight lug in this embodiment, to pivot around the horizontal axis of the threaded cable 11, 12. As can be furthermore discerned especially from FIG. 3, the control mechanism 15 is directly connected to the guide rail 3 in this embodiment, and the entrainment means 130 penetrates through the control mechanism 15 and projects therebeyond to come into engagement with the slide block 14. In order to assure the engagement of the entrainment means 130, a recess in the sliding block also comprises a snap-in position 26 secured on both sides by rising inclines 25.

In the embodiments depicted in FIGS. 7 to 11, entrainment means 131 are supported in tube-shaped guides 27 disposed in the outer side walls of the guide rails 3 so as to be pivotable around a horizontal axis parallel to the longitudinal axis of the guide rails 3. However, in this case the entrainment means 131 comprises a control lug 28 and an entrainment lug 29 which are arranged in parallel vertical planes. The control lug 28 engages a cam-shaped control arrangement 30. The entrainment lug 29 engages the sliding block 14. However, this is explicitly only the case along the length of the displacement travel of the sliding roof case.

Figure 12A:
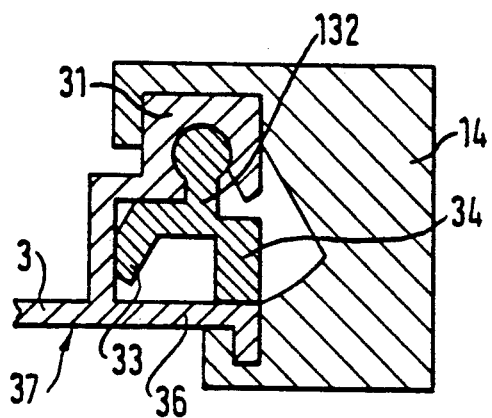
FIGS. 12a and 12b are sectional illustrations through a control apparatus of a third embodiment with the entrainment or follower device being depicted in both possible positions.
Figure 12B:
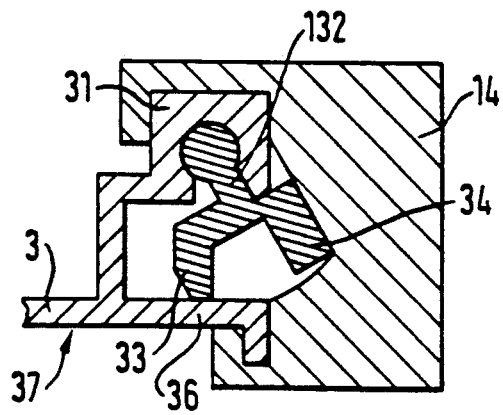
Figure 15:
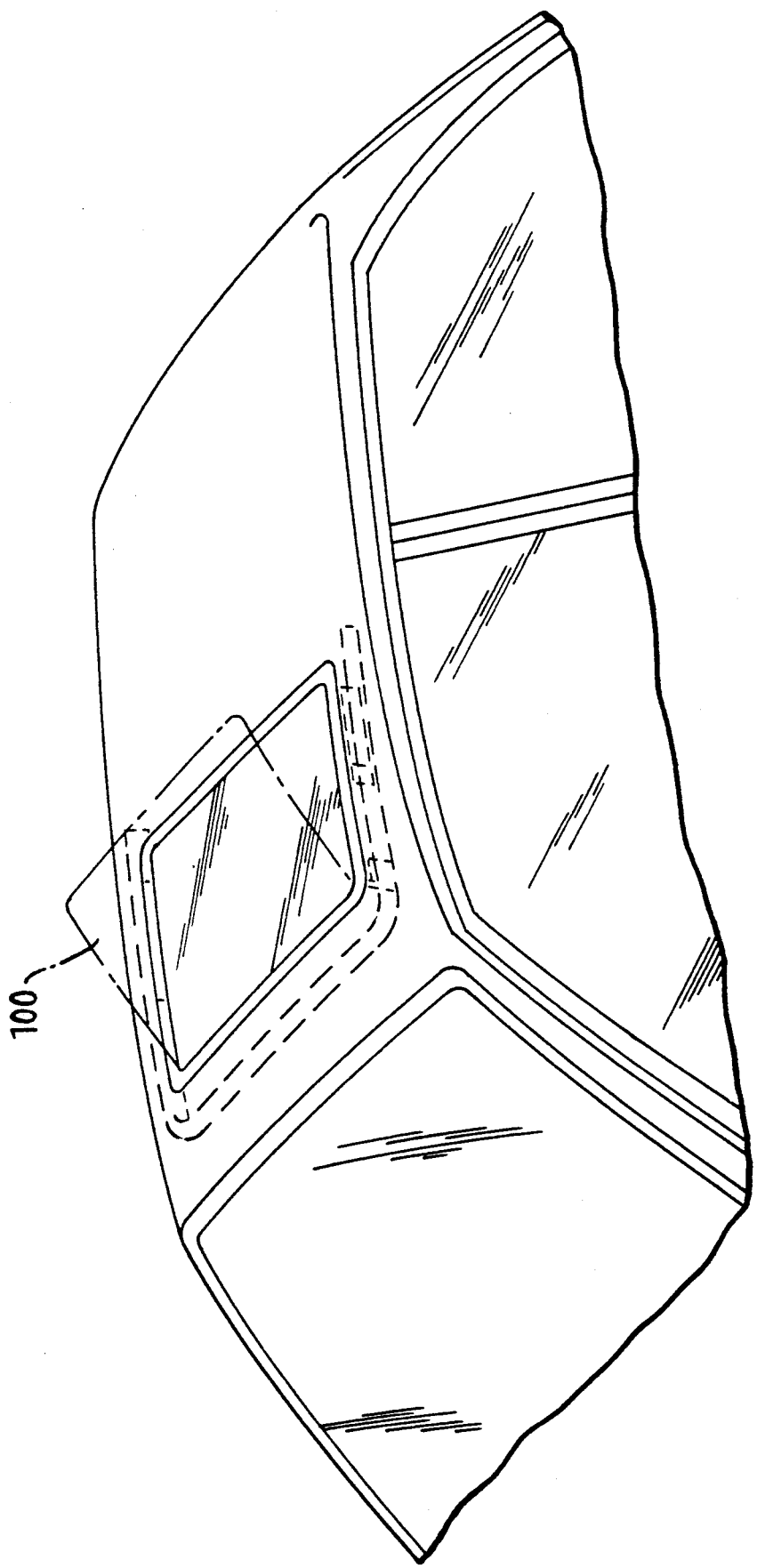
FIG. 15 is a perspective view showing the roof top in both closed and raised positions.

In the embodiment depicted in FIG. 12, an entrainment device 132 is supported in a hanging position in a tube-shaped guide 31 which has an open slot-shape on one side and is configured in one piece with the outer side wall of the guide rail 3 so as to be pivotable around a horizontal axis aligned in the guide rail longitudinal direction. This entrainment means 132 comprises a control lug 33 and an entrainment lug 34 in an approximated V-shaped arrangement. A control mechanism arranged at an extension 36 of the bottom 37 of the guide rails 3 and cantilevered sideways is assigned to the control lug 33 in a manner not shown in detail here.

Figure 4:
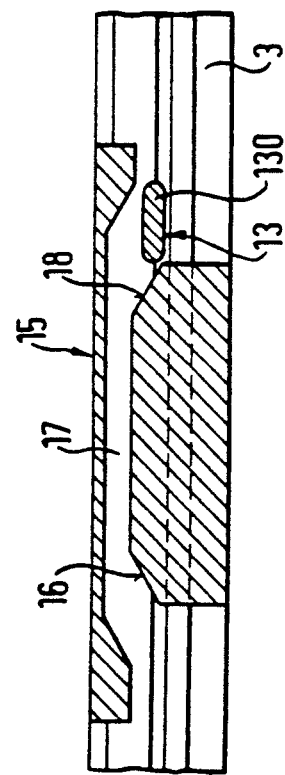
FIG. 4 is a section through FIG. 3 along the line IV—IV.
Figure 5:
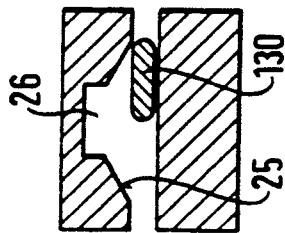
FIG. 5 is a section through FIG. 3 along the line V—V.
Figure 6:
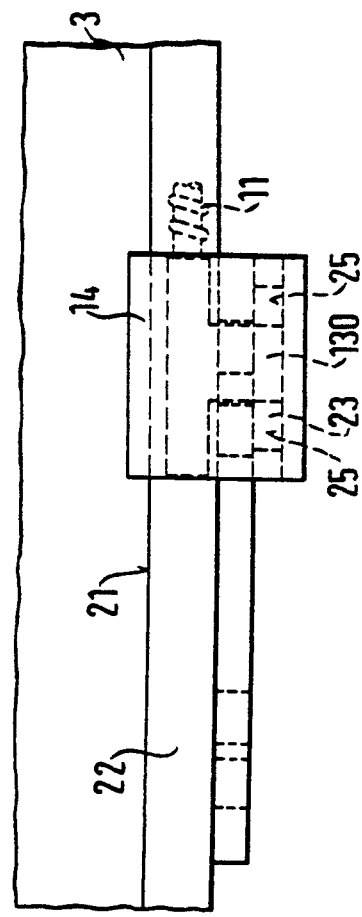
FIG. 6 is a plan view of the sectional illustration in FIG. 3.

FIG. 13 shows diagrammatically an entrainment means 134 articulated to threaded cables 11, 12 so as to be pivotable around an axis 38 oriented transversely to the longitudinal axis of the guide rail 3. A control mechanism 15, which is only diagrammatically shown and has a functional mode which corresponds to that depicted in FIGS. 4 and 8, is assigned to said entrainment means 134.

Finally, the arrangement of a displacement apparatus is shown in FIG. 14, in which one of the parts of the displacement mechanism for the sliding roof case, in this case, the connecting link or slide 40 is arranged so as to be longitudinally displaceable at the roof frame 41 of the vehicle body. In connection with the longitudinally displaceable arrangement of one of the parts, in this case the connecting link or slide 40 at the roof frame of the vehicle body, the threaded cables 11, 12 are also guided in tube-shaped guides 42 fastened to the roof frame 41. Furthermore, a sliding block 140 connected with the connecting link 40 by means of a bridge member 201, while allowing a free travel of clearance for the entrainment means of the threaded cables, is displaceably guided at the roof frame 41 of the vehicle body. A control arrangement 150 corresponding to the control arrangements 15 in FIGS. 3 to 11 and coacting with the engagement means at the threaded cables is fixedly arranged at the roof frame 41.

While the invention has been illustrated and described as embodied in a raisable-sliding roof of shallow construction for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by letters patent is set forth in the appended claims:

1. A sliding-raisable roof of shallow construction for motor vehicles, comprising:
    a rigid roof top displaceable between at least two positions;
    a sliding roof case arranged beneath the rigid roof top;
    displacement means for the sliding roof case, said displacement means including guide rails;
    a single drive motor;
    two compression-resistant threaded cables connected with the single drive motor so as to be driven synchronously in opposite directions so as to drive the rigid roof top and displace the sliding roof case, each of the threaded cables having one end with means which co-acts with the displacement means of the sliding roof case, and another end extending in a rearward direction of the roof case for co-acting with the rigid roof top, the threaded cables providing for drive of the displacement means of the sliding roof case and the rigid roof top; and
    entrainment means for causing the threaded cables to cooperate with the displacement means, and control means on the guide rails to bring the entrainment means into engagement with the displacement means of the sliding roof case along a required displacement path.

2. A sliding-raisable roof according to claim 1, wherein the control means comprises slot-like opening guides provided at the guide rails for passage of the entrainment means which are pivotable around a horizontal axis parallel to the guide rail longitudinal axis, the threaded cables being arranged in the slot-like opening guides and the slot-like opening guides being widened in the region of the control means; and the control means comprise a cam-shaped control apparatus assigned to the entrainment means so as to pivot the entrainment means into an effective entrainment position, the cam-shaped control apparatus including, respectively, one raising and one descending incline as well as a control groove corresponding to a length of the displacement path of the displacement means of the sliding roof case, the cam-shaped control apparatus being fixed to one of the side walls of the guide rails, and still further comprising a bridging member, the entrainment means having an entrainment position in which the entrainment means is in engagement with a sliding block guided to be longitudinally displaceable at the guide rail and connected by the bridging member with the displacement means for the sliding roof case.

3. A sliding-raisable roof according to claim 2, wherein the displacement means includes a cam guide and a lug engagable therein, provided so that selectively one of the lug and the cam guide is supported at the guide rail so as to be longitudinally displaceable and the respective other of the cam and lug is arranged fixedly at a roof frame of a vehicle body.

4. A sliding-raisable roof according to claim 3, wherein the entrainment means comprises respectively straight tongue-like members pivotable around a horizontal axis oriented in a guide rail longitudinal direction so as to penetrate a cam-shaped control apparatus of the control means arranged at the guide rail and coact at their free end with a sliding block guided displaceably in the guide rails and connected by the bridging member with one of the cam guide and the lug of the displacement means of the sliding roof case.

5. A mechanism for moving a sliding-raisable roof top for motor vehicles between at least two positions, said mechanism comprising:
    a sliding roof case disposed beneath said roof top;
    displacement means for said sliding roof case, said displacement means including guide rails;
    a single drive motor;
    two compression-resistant threaded cables connected with said motor so as to be driven synchronously in opposite directions so as to drive said roof top and displace said sliding roof case, each said threaded cable having one end with entrainment means co-acting with said displacement means of said sliding roof case and another end extending rearwardly for co-acting with said roof top.

6. The mechanism of claim 5 further comprising control means for bringing said entrainment means into engagement with said displacement means.

7. The mechanism of claim 6 wherein the displacement means includes a cam guide and a lug engageable therein.

8. The mechanism of claim 7 wherein the entrainment means comprise respectively straight tongue-like members pivotable around a horizontal axis.

* * * * *

UNITED STATES PATENT AND TRADEMARK OFFICE
CERTIFICATE OF CORRECTION

PATENT NO. : 5,184,870

DATED : February 9, 1993

INVENTOR(S) : Karl Bauhof

It is certified that error appears in the above-identified patent and that said Letters Patent is hereby corrected as shown below:

Title Page:
Abstract, line 1, "of" should be -- for -- (second occurrence).

Column 2, line 36, after "in" insert -- a --.

Column 5, line 46, after "claimed" insert -- as new --.

Signed and Sealed this

Twenty-first Day of December, 1993

BRUCE LEHMAN

*Attest:*

*Attesting Officer*   Commissioner of Patents and Trademarks